United States Patent [19]

LaValley

[11] Patent Number: 4,816,169
[45] Date of Patent: Mar. 28, 1989

[54] VACUUM FILTER SYSTEM AND VACUUM FILTER DISCHARGE FLOW ASSEMBLY

[75] Inventor: Richard W. LaValley, Vancouver, Wash.

[73] Assignee: LaValley Industries, Inc., Vancouver, Wash.

[21] Appl. No.: 37,038

[22] Filed: Apr. 10, 1987

[51] Int. Cl.4 .............................................. B01D 33/06
[52] U.S. Cl. .................................... 210/784; 210/402; 210/404; 162/372
[58] Field of Search ............... 210/784, 402, 404, 406; 162/323, 335, 357, 368, 372

[56] References Cited

U.S. PATENT DOCUMENTS

| 1,558,038 | 10/1925 | Mount | 210/784 |
| 1,686,094 | 10/1928 | Manning | 210/784 |
| 1,855,835 | 4/1932 | Joyce | 210/404 |
| 2,362,300 | 11/1944 | Nyman | 210/395 |
| 3,027,011 | 3/1962 | Flynn | 210/404 |
| 3,363,774 | 1/1968 | Luthi | 210/404 |
| 4,383,877 | 5/1983 | LaValley | 210/402 |
| 4,419,165 | 12/1983 | LaValley | 210/404 |

Primary Examiner—Ivars Cintins
Assistant Examiner—Linda S. Evans
Attorney, Agent, or Firm—Marger & Johnson

[57] ABSTRACT

The improved rotary vacuum filter discharge flow assembly provides a discharge filtrate stream having a substantially increased filtrate flow velocity, a reduced vacuum loss, a reduced level of turbulence and air entrainment to means defining an axially-extending valve-receiving space in communication with a remote filtrate collection area. The subject assembly, which is located at one end of a rotary vacuum filter, includes a plurality of radially-disposed, inlet conduit means connected to and in communication with the rotary vacuum filter discharge flow assembly and comprises a plurality of radially-disposed discharge conduit means for transporting the discharge filtrate stream from the inlet conduit means to the valve-receiving space means. Each of the discharge conduit means are connected at one end to one end of the inlet conduit means, and are joined at the other end to respective adjacent discharge conduit means for defining the valve-receiving space means.

23 Claims, 2 Drawing Sheets

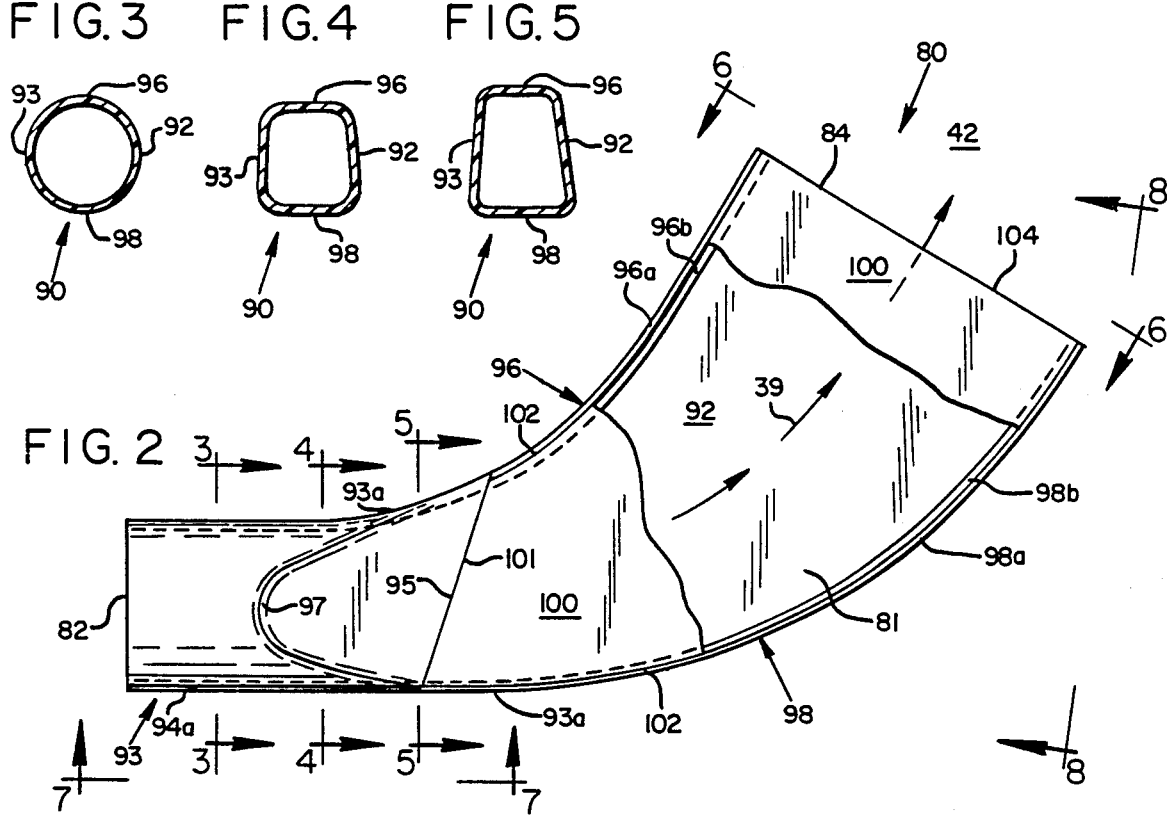
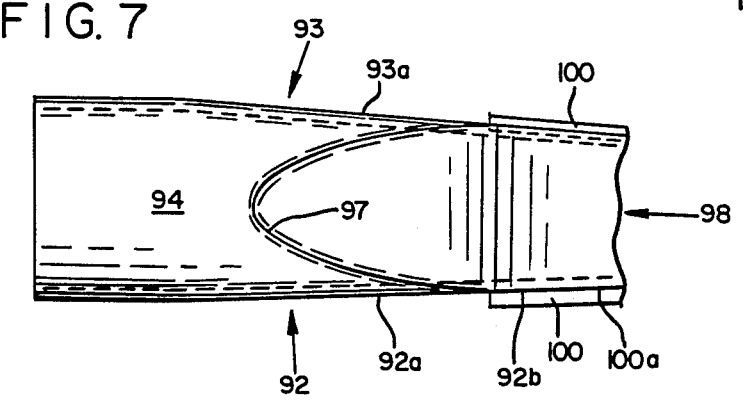
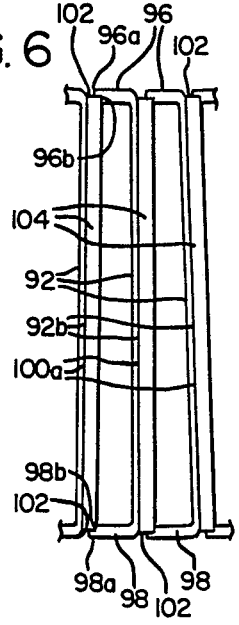
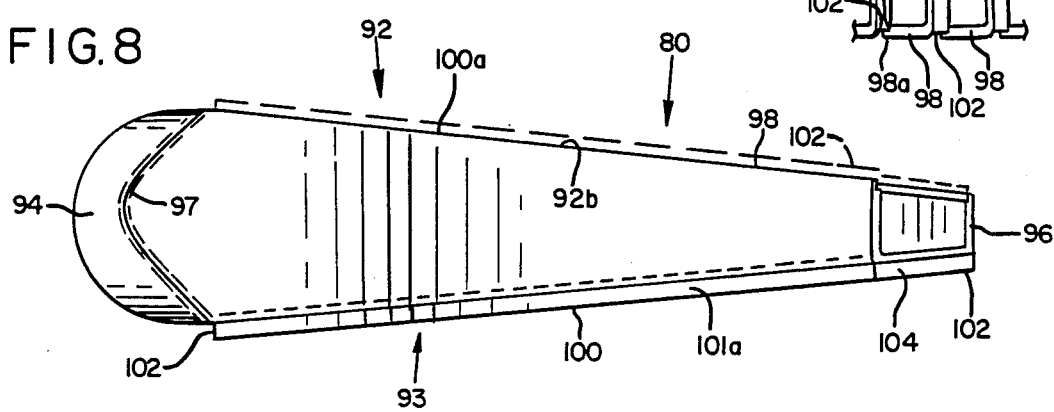

VACUUM FILTER SYSTEM AND VACUUM FILTER DISCHARGE FLOW ASSEMBLY

BACKGROUND OF THE INVENTION

The present invention relates to an improved rotary vacuum filter and to a rotary vacuum filter discharge flow assembly, and particularly to those types of rotary vacuum filter systems having an axial valve housing located at one end of the filter drum, which maintains a maximum available vacuum and filtrate flow velocity and a substantially reduced level of tubulence and air entrainment.

Rotary vacuum filters have been in use in the pulp and papermaking industry for over 20 years to separate wood pulp from its pulping filtrate liquid. U.S. Pat. No. 3,363,774, for example, covers a conventional pipe machine-type rotary vacuum filter fabricated of metal having an axial valve housing at one end of the filter drum. U.S. Pat. Nos. 4,383,877 and 4,419,165 describe similar rotary vacuum filters which are made of a polymeric material. All of these rotary vacuum filter remain in use today, having mechanical and hydraulic designs little changed in over 50 years.

Conventional vacuum filters typically comprise a rotary drum partially submerged in a tank of pulp slurry. The drum has axially-extending filtrate channels or compartments spaced about its periphery, with such compartments covered by a filter screen. These filtrate compartments communicate through bucket sections, drainage conduits and a frusto-conical contoured annular valve housing in communication with a source of subatmospheric pressure. A stationary valve positioned within a valve seat portion of the valve housing controls the application of subatmospheric pressure to the respective valve chambers of the housing.

As the drum rotates about its axis and subatmospheric pressure is applied, the screen rotates through the pulp slurry and collects a wet mat of fibers from that slurry. When the screen emerges from the tank, filtrate is drawn through the screen and compartments into a filtrate discharge system which removes the liquid from the pulp mat. The filtrate passes through the discharge system including generally hollow bucket sections, drainage conduits and valve chambers, and is then discharged from the vacuum filter through suitable piping. As the drum continues its rotation, the stationary valve member periodically blocks off filtrate compartments from the source of subatmospheric pressure, thereby enabling removal of the pulp mat from the surface of the screen.

The hydraulic design of these conventional rotary vacuum filters often produces a reduced pressure head and a lowering of the available vacuum through the filter system. Excessive turbulent flow of the filtrate is also created and the filtrate flow velocity is decreased thereby lowering the amount of filtrate that can be removed from the system by vacuum filtration. The excessive level of turbulence generally causes an entrainment of excessive amounts of air in the filtrate. Excessive entrained air can have a undesirable effect on the drainage rate of the pulp. For example, the air bubbles produced take on the physical properties of a solid. When these solids are literally filtered out of the filtrate by the fiber mat, an actual blockage of the flow of the filtrate and a lowering of the drainage rate will esult. As the drainage rate is lowered, the washer area required for a particular rate of production goes up, thereby reducing the effective capacity of the vacuum filter system.

To overcome this problem, a higher than optimum inlet pulp consistency is generally required. Entrained air with the same properties as the solids also blocks the flow of the shower water in the sheet and channels it unevenly resulting in less efficient washing. This lowers the liquid displacement ratios of the pulp resulting in higher chemical usage costs. Air entrainment blocks the flow of additional air through the mat during the pulp drying cycle. This results in lower discharge consistencies and a lowering of the driving force of the bleaching agent which in turn lowers the bleaching efficiency and results in higher bleaching chemical costs. Thus, entrainment of air in the filtrate has a major effect on increasing the cost of producing pulp as well as lowering the capacity of the washing equipment.

In some applications, entrained air results in the production of excessive amounts of foam. Conventionally, the entrained air problem has not been overcome by changing the mechanical design of the vacuum filter. Therefore, foam reduction is accomplished chemically by the addition of defoaming agents. However, chemical defoamers are very expensive and result in substantial additional manufacturing costs.

Accordingly, there is a need for a rotary vacuum filter system in which the pressure head and filtrate flow velocity are maintained, and turbulence and air entrainment are significantly reduced, so that a higher quality pulp product can be produced at a higher production rate, in a more efficient manner, and with significantly lower pulping chemical usage.

SUMMARY OF THE INVENTION

This invention is directed to an improved rotary vacuum filter system. Certain defects in the hydraulic design of a conventional rotary vacuum filter not previously recognized by the prior art which cause the aforementioned problems, to a great extent, have now been identified. Accordingly, the above-described conventional hydraulic system has now been modified according to the teachings of the present invention to overcome the previously-described problems associated with loss of pressure head and filtrate flow velocity, excessive turbulent filtrate flow, and air entrainment.

It has now been recognized that defects in the conventional mechanical design of a rotary vacuum filter involving the discontinuous and/or angularly-disposed filtrate flow paths are the major cause of the above-described problems releated to loss of pressure head and filtrate flow velocity, excessive turbulence, and air entrainment. In prior art rotary vacuum filters, for example, such as described in FIG. 18 of U.S. Pat. No. 4,383,877 and U.S. Pat. No. 4,419,165, the filtrate flow path is discontinuous and angularly-disposed following outwardly divergent portions of inlet section 39 and of the exterior walls of valve chamber 36. Therefore, the filtrate flow diverges at these portions of the filtrate flow path and moves in a direction substantially parallel to the axially-disposed, centrally-located valve housing causing tubulent filtrate flow within valve chamber 36. The radial cross-sectional area at the entry portion of inlet 39, which communicates with conduit 48, is substantially different than the radial cross section at its exit portion. The radial cross-sectional area at the entry portion of valve chamber 36 is also substantially different than the radial cross-sectional area at its exist. Furthermore, the radial cross-sectional area of the entirety of the flow passageway from the entry portion of the inlet section to the valve housing port is not constant. What results is a filtrate flow velocity which is reduced, variable and discontinuous, and which is transported at a rate of acceleration of the discharge filtrate stream which is not constant. This produces a filtrate flow which is excessively tubulent, having a high level of air entrainment in the filtrate liquid, which gives rise to a substantial loss of pressure head and a resultant vacuum within the hydraulic system while the filtrate velocity is considerably slowed.

The improved rotary vacuum filter discharge flow assembly provides a discharge filtrate stream having a substantially increased filtrate flow velocity, a reduced vacuum loss, a reduced level of turbulence and air entrainment to means defining an axially-extending valve-receiving space in communication with a remote filtrate collection area. The subject assembly, which is located at one end of a rotary vacuum filter, includes a plurality of radially-dispersed, inlet conduit means connected to and in communication with the rotary vacuum filter discharge flow assembly and comprises a plurality of radially-disposed discharge conduit means for transporting the discharge filtrate stream from the inlet conduit means to the valve-receiving space means. Each of the discharge conduit means are connected at one end to one of the inlet conduit means, and are joined at the other end to respective adjacent discharge conduit means for defining the valve-receiving space means.

Each of the discharge conduit means comprises wall means. The interior surface of the wall means are contoured to define a continuous, smoothly curved discharge filtrate flow passageway for directing the flow of the discharge filtrate within the passageway at a constant rate of acceleration from the inlet of the discharge conduit means to the outlet of the discharge conduit means, respectively, thereby delivering the discharge filtrate to the valve-receiving space at an increased level of velocity, with less vacuum head loss, a substantially reduced level of turbulence and air entrainment.

Regarding certain preferred features of the discharge flow assembly, the radial cross-sectional area of the discharge filtrate flow passageway is substantially constant from respective inlet portion to the outlet portion of the discharge conduit means. The radial cross-sectional are at the inlet portion is also substantially the same as the radial cross-sectional are at the outlet portion.

In further preferred forms of the present invention, the radial cross-sectional configuration of the inlet portion is substantially circular and/or the radial cross-sectional configuration of the outlet portion is substantially trapezoidal in form. Furthermore, as opposed to the prior art rotary vacuum filters, the flow of the filtrate in the improved rotary vacuum filter of this invention is delivered to the valve-receiving space means in a direction normal to the axially-disposed axis of the space means. Finally, the wall means of this improved discharge flow assembly comprise respective pairs of sidewalls and end walls joined one to the other.

These pairs of sidewalls are each contoured such that their respective outer edges diverge from one another in a headwardly direction toward the outlet end of the discharge conduit means. At the same time, the pairs of end walls are each contoured such that their respective outer edges converge from one another in a headwardly direction toward the outlet end of the discharge conduit means.

The foregoing and other objects, features and advantages of the invention will become more readily apparent from the following detailed description which proceeds with reference to the drawings.

BRIEF DESCRIPTION OF THE DRAWINGS

FIG. 2 is a side elevational view, partially in section, of a discharge conduit means 80 of FIG. 1.

FIG. 3 is a cross-sectional view taken along line 3—3 of FIG. 2.

FIG. 4 is a cross-sectional view taken along line 4—4 of FIG. 2.

FIG. 5 is a cross-sectional view taken along line 5—5 of FIG. 2.

FIG. 6 is a fragmentary view taken along line 6—6 of FIG. 2.

FIG. 7 is a fragmentary view taken along line 7—7 of FIG. 2.

FIG. 8 is an elevation view taken along line 8—8 of FIG. 2.

DETAILED DESCRIPTION

Improved Rotary Vacuum Filter—General Description

Figure 1:
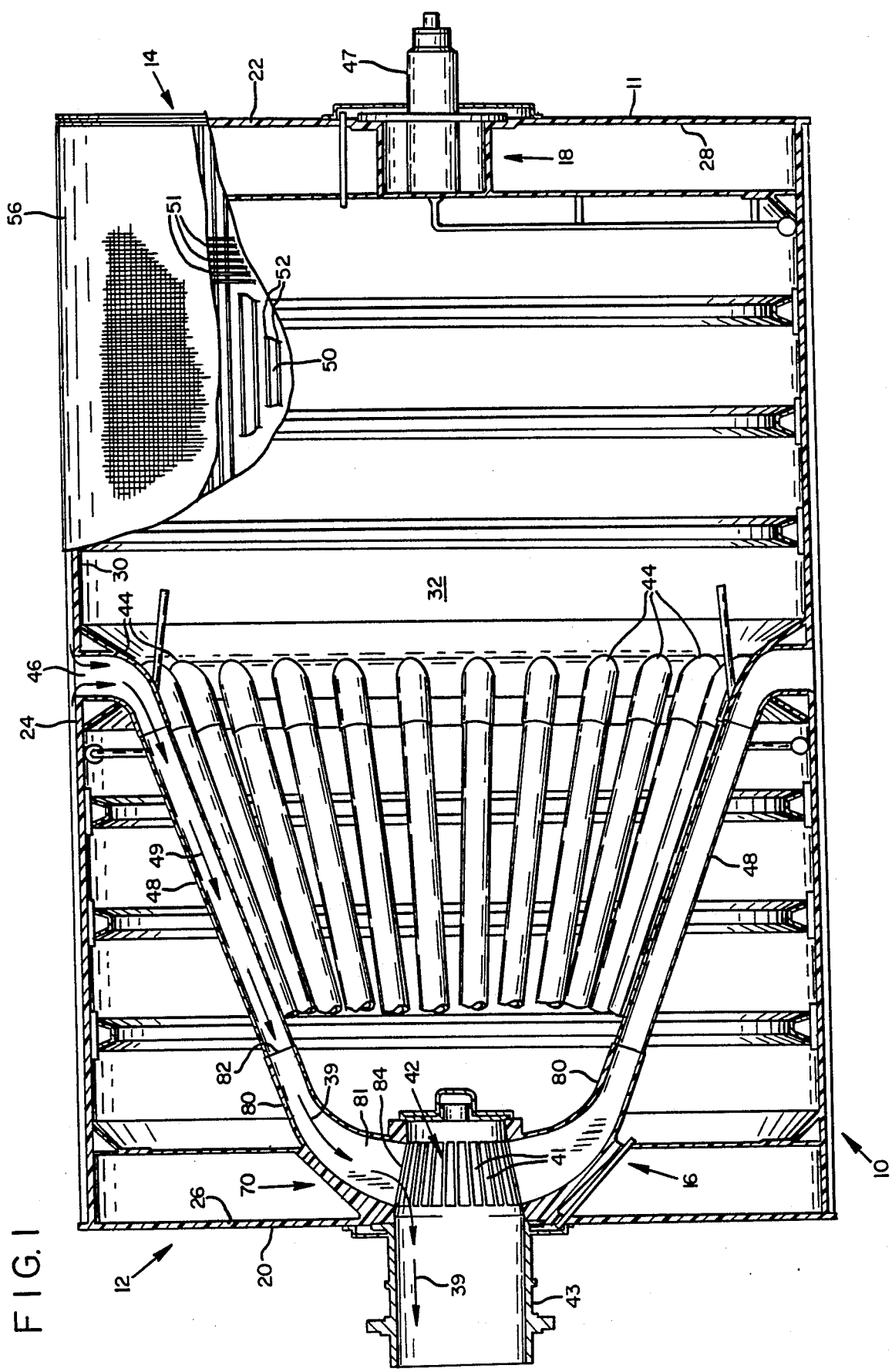
FIG. 1 is a side elevational view, partially in section, of the rotary vacuum filter of the present invention.

Referring to FIG. 1, the improved rotary vacuum filter 10 of the present invention, which as depicted is of the pipe machine type, includes an improved rotary vacuum filter discharge flow assembly 70. Rotary vacuum filter 10 further comprises a generally cylindrical drum 11 having a head end 12 and tail end 14. A drive head assembly 16 is positioned at the head end of the drum while a tail assembly 18 is located at the tail end. Flat opposite end walls 20, 22 of the respective head and tail assemblies are joined together by a generally cylindrical deck portion 24 to form the drum. The inner surfaces 26, 28 of respective end walls 20, 22, together with the inner surface 30 of deck 24 define a cylindrical chamber 32 within the vacuum filter 10.

The discharge flow assembly 70 of this invention, which comprises a plurality of radially-disposed discharge conduits 80, is mounted to drive head assembly 16. Conduits 80 each define a continuous, smoothly curved discharge flow passageway 81, each transporting a discharge filtrate stream, indicated by arrows 39, from the failmost inlet end 82 to the headmost outlet end 84 of conduit 80. Stream 39 exits through outlet end 84 and is delivered to means defining an axially-extending valve-receiving space 42. This valve-receiving space means 42 communicates through filtrate discharge outlet 41 with a discharge pipe 43 which in turn is connected to a source of subatmospheric pressure and is in communication with a remote filtrate collection area (not shown). Plural generally hollow bucket sections 44, spaced circumferentially about the interior surface 30 of deck 24, are provided approximately midway between end walls 20, 22. Each such bucket section 44 communicates through an opening 46 to the exterior of the drum. In addition, each bucket section is in communication with a respective one of the discharge conduit means 80. Plural interior drainage inlet conduits 48, connected to and in communication with the discharge flow assembly 70, are provided to complete a filtrate discharge path, indicated by arrows 49, between the associated buckets 44 and the discharge conduit means 80.

Vacuum filter drum 11 is rotatably mounted on a tail shaft 47 at tail end 14 via a support (not shown). The drum 11 is mounted at its opposite end by discharge pipe 43 which forms a trunnion extension of drive head assembly 16.

Typically, the deck surface 24 supports a set of circumferentially spaced apart axially extending channels 50 with radially extending ribs 52. The ribs are covered with circumferentially wound wire 51, which supports a surface filter screen 56 and defines the filter medium of the drum. The circumferentially spaced ribs 52 define axially and radially extending sets of filtrate compartments, closed at their axially outer ends and communicating through openings 46 to the interior of the bucket sections. Valve-receiving space means 42 receives a conventional substantially stationary valve (not shown) which extends through a predetermined arc of the space means 42.

In general operation, drum 11 is partially submerged in a tank typically containing a pulp slurry. As the drum rotates, the valve member periodically and selectively blocks off each respective discharge conduit means 80 from communication with subatmospheric pressure from discharge pipe 43. This permits the removed of a pulp mat which forms on the exterior surface of the screen. This mat is formed as follow: As the drum rotates into the slurry, a partial vacuum is applied to those filtrate compartments not blocked by the valve member. This vacuum causes pulp fibers in the slurry to collect on the surface of the filter screen 56. As the screen surface emerges from the slurry, the vacuum continues to be applied. This draws discharge filtrate liquid from the mat through the compartments defined by ribs 52 and through openings 46, bucket sections 44, inlet conduit means 48, discharge conduit means 80, valve-receiving space means 42, and discharge pipe 43 to a filtrate tank or other remote collection areas (not shown). As each respective discharge conduit means becomes sealed off from the continuously applied vacuum, by the stationary valve member, the de-watered pulp mat can be removed, as by a doctor blade from the screen surface.

DETAILED DESCRIPTION OF THE ROTARY

Vacuum Filter Discharge Flow Assembly

Referring now to FIGS. 1-8, the improved rotary vacuum filter discharge flow assembly 70, which defines an axial valve chamber in the form of axially-extending valve-receiving space means 42 (see FIG. 1), comprises a plurality of radially-disposed discharge conduit means 80 for transporting discharge filtrate stream 39 from the radially-disposed inlet conduit means 48 to the valve-receiving space means 42.

Each discharge conduit means 80 is connected at its tailmost end to one of a plurality of inlet conduit means 48 and at its headmost end defines the valve-receiving space means 42. Each discharge conduit means 80 comprises radially-extending wall means 90 which are contoured and which defined a continuous, smoothly curved discharge filtrate flow passageway 81 which extends from the inlet 82 to the outlet 84 of the discharge conduit means 80.

Wall means 90 comprises radially-extending sidewalls 92 and 93 joined at their respective ends 92a and 93a to respective radially-extending inwardmost and outwardmost end walls 96 and 98. Sidewall 92 is contoured such that the edges 92a diverge from one another in a headwardly direction toward the outlet 84. Similarly, sidewalls 93 are contoured such that the edges 93a diverge from one another in a headwardly direction. As best seen in FIG. 2, sidewall 93 (and also sidewall 92 which is not specifically depicted) comprise two sections denoted 94 and 100, respectively. The first section 94 extends from the tailmost end at inlet end 82 in the form of a cylinder having a substantially circular radial cross section, extends headwardly toward and beyond the transition area 97 where the radial cross-sectional configuration of the sidewall 94 becomes trapezoidal, and then terminates at its inner end 95. This first section is not connected at its adjacent sidewalls to an adjacent discharge conduit means. The second section comprises a sidewall plate means 100 contoured such that the other edges 102 diverge from one another in a headward direction from its inner end 101, which abuts and is joined to the inner end 95 of first section 94, to its outer end 104 which, together with the outer ends of sidewall 92 and end walls 96 and 98, form outlet end 84. Similarly, end walls 96 and 98 are contoured such that the respective edges 96a and 98a converge toward one another in a headwardly direction. First section 94 includes an outer edge 94a and inner end 101 includes end section 101a, respectively.

As best seen in FIG. 6, the respective outer ends 96a and 98a of respective innermost and outermost end walls 96 and 98 define respective radially extending groove means 96b and 98b for receiving the respective outer ends 102 of sidewall plate means 100. The radially inward edges 92a and 104 are planar and sloped to define the limits of the valve-receiving space means 42 with the narrowest diameter of the space being positioned tailward of the widest dimension. The outer side 92b of each sidewall 92 is adheringly joined to the outer side 100a of each adjacent plate means 100 of each adjacent discharge conduit means 80 to form the rotary vacuum filter discharge flow assembly 70 of the present invention.

The configuration of sidewalls 92 and 93 is such that their respective outer edges 92a and 93a are contoured so that they substantially radially diverge from inlet end 82 to outlet end 84 of conduit 80 (see FIG. 2). Moreover, the configuration of end walls 96 and 98 is such that their respective outer edges 96a and 98a are contoured so that they substantially radially converge from inlet end 82 to outlet end 84 (see FIG. 8). The configuration of passageway 81 is coextensive with the configuration of sidewalls 92 and 93, and end walls 96 and 98, respectively. The extent of the divergency of sidewalls 92 and 93 substantially corresponds to the extent of convergency of end walls 96 and 98 from the inlet end 82 to the outlet end 84 such that the radial cross-sectional area of passageway 81 is substantially constant. Furthermore, all of the respective sidewalls and end walls are smoothly curved, and the flow passageway 81 is continuous from inlet end 82 to outlet end 84, in a direction toward the valve-receiving space means 42. In this way, the flow of the discharge filtrate stream 39 within passageway 81 proceeds at a constant rate of acceleration and is delivered to valve-receiving space means 42 at substantially minimal levels of turbulence and air entrainment and in a direction substantially normal to space means 42.

As more particularly seen with reference to FIGS. 2-6, the radial cross-sectional area of discharge filtrate flow passageway 81, as defined by the inner cross-sectional area of wall means 90, is substantially constant from inlet 82 to outlet 84. By varying the specific dimensions of the sidewalls and end walls forming wall means 90, while maintaining a substantially constant relative ratio of sidewall to end wall dimensions, a substantially constant radial cross-sectional area as described above will be provided. This is of particular importance at the inlet and outlet ends of the discharge conduit means where flow from inlet conduit means 48, or into valve-receiving space means 42, will occur. Therefore, even though the respective sidewall or end wall cross-sectional dimensions may vary, they are in relative proportion one to the other whereby the cross-sectional area at any point along the passageway 81, and particularly at the respective inlet and outlet ends, is substantially the same.

In the preferred form of this invention, the inlet end 82 of the first section 94, and accordingly the inlet portion of the discharge filtrate flow passageway 81, has a substantially circular radial cross-sectional configuration. The configurational dimensions of the inlet end 82 and the circular end portion of inlet conduit means 48 are substantially identical in configuration which results in a continuous uniform flow passageway between the respective inlet and discharge conduit means.

The outlet end 84 of discharge conduit means 80 is trapezoidal in configuration, and in this case forms an elongated trapezoidal configuration (see FIG. 6).

As the radial cross-sectional configuration of the discharge conduit means extends away from the inlet end 82 toward the outlet end 84, the radial cross-sectional configuration changes from circular shape (see FIG. 3) to a rounded rectangular shape (see FIG. 4). At the section described at FIG. 5, the rounded rectangular shape has become trapezoidal with more clearly defined sidewalls and end walls. As the cross-sectional configuration extends in a smoothly curved path toward the valve-receiving space means 42, it may be necessary for the radial cross-sectional area of the discharge conduit means to be increased slightly so that continuous and constant rate of acceleration is maintained within passageway 81 by the discharge filtrate stream 39.

Another preferred feature of this invention provides for the flow of filtrate 39 to be delivered to valve-receiving space means 42 in a direction substantially normal to the axially-disposed axis of space means 42 (see FIG. 1). In this way, the constant acceleration rate is maintained as well as the continuity of flow through the valve-receiving space means 42.

Detailed Description of the Preferred Method of Making the Rotary Vacuum Filter Discharge Flow Assembly and the Rotary Vacuum Filter The method of making rotary vacuum filter discharge flow assembly 80 and rotary vacuum filter 10 are similar to the method for making an annular housing 34 and rotary drum filter 10 in U.S. Pat. No. 4,383,877. U.S. Pat. No. 4,383,877 is incorporated herein by reference, particularly that portion of the detailed description from column 6, line 6, to column 11, line 63, respectively.

Having illustrated and described the principles of my invention in a preferred embodiment thereof, it should be readily apparent to those skilled in the art that the invention can be modified in arrangement and detail without departing fromm such principles. I claim all modifications coming within the spirit and scope of the accompanying claims.

I claim:

1. A rotary vacuum filter discharge flow assembly for providing a discharge filtrate stream, having an increased flow velocity, a reduced vacuum loss, substantially reduced level of turbulence and air entrainment, said flow assembly providing said filtrate stream to a means defining an axially-extending valve-receiving space in communication with a remote filtrate collection area located at one end of a rotary vacuum filter, said rotary vacuum filter including a plurality of radially-disposed, inlet conduit means connected to and in communication with said rotary vacuum filter discharge flow assembly, comprising:

a plurality of radially-disposed discharge conduit means for transporting said discharge filtrate stream from said inlet conduit means to said valve-receiving space means, one end of each of said discharge conduit means being connected to one of said inlet conduit means, and the other end of said discharge conduit means being joined to one of said respective adjacent discharge conduit means for defining said valve-receiving space means, each discharge conduit means comprising wall means, the interior surface of said wall means being contoured to define a continuous, smoothly curved discharge filtrate flow passageway for directing the flow of said discharge filtrate within said passageway at a constant rate of acceleration from an inlet portion of said discharge conduit means to an outlet portion of said discharge conduit means, respectively, thereby delivering said discharge filtrate to said valve-receiving space at a substantially reduced level of turbulence and air entrainment.

2. The discharge flow assembly of claim 1, wherein the radial cross-sectional area of said discharge filtrate flow passageway is substantially constant from said inlet portion to said outlet portion.

3. The discharge flow assembly of claim 2, wherein the radial configuration of the inlet portion is substantially circular and the radial configuration of the outlet portion is substantially trapezoidal.

4. The discharge flow assembly of claim 1, wherein the radial cross-sectional configuration of the inlet portion of said discharge filtrate flow passageway is substantially circular.

5. The discharge flow assembly of claim 1, wherein the radial cross-sectional configuration of the outlet portion of said discharge filtrate flow passageway is substantially trapezoidal.

6. The discharge flow assembly of claim 1, wherein said discharge conduit means deliver the flow of said filtrate to said valve-receiving space means in a direction substantially normal to the axially-disposed axis of said space means.

7. The discharge flow assembly of claim 1, wherein said wall means comprise respective pairs of sidewalls and end walls joined one to the other, said sidewalls being contoured such that their respective outer edges diverge from one another in a headwardly direction toward said outlet portion, and said end walls being contoured such that their respective outer edges converge from one another in a headwardly direction toward said outlet portion.

8. The discharge flow assembly of claim 7, wherein the radial cross-sectional configuration of the inlet portion of said discharge filtrate flow passageway is substantially circular.

9. The discharge flow assembly of claim 7, wherein the radial cross-sectional configuration of the outlet portion of said discharge filtrate flow passageway is substantially trapezoidal.

10. The discharge flow assembly of claim 7, wherein the radial configuration of the inlet portion is substantially circular and the radial configuration of the outlet portion is substantially trapezoidal.

11. A rotary vacuum filter which comprises:
a plurality of radially-disposed inlet conduit means for transporting a discharge filtrate stream from a remote source;
means defining an axially-extending valve-receiving space located at the discharge end of said rotary vacuum filter for delivering said discharge filtrate stream to a remote collection area;
a plurality of radially-disposed discharge conduit means for transporting said discharge filtrate stream from said inlet conduit means to said valve-receiving space means, each of said discharge conduit means being connected at one end to each of said inlet conduit means, and being joined at the other end to one of said respective adjacent discharge conduit means for defining said valve-receiving space means,
each discharge mens comprising wall means, the interior surface of said wall means being contoured to define a continuous, smoothly curved discharge filtrate flow passageway for directing the flow of said discharge filtrate within said passageway at a constant rate of acceleration from an inlet portion of said discharge conduit means to an outlet portion of said discharge conduit means, respectively, thereby delivering said discharge filtrate to said valve-receiving space at a substantially reduced level of turbulence and air entrainment.

12. The rotary vacuum filter of claim 11, wherein the radial cross-sectional area of said discharge filtrate flow passageway is substantially constant from said inlet portion to said outlet portion.

13. The rotary vacuum filter of claim 11, wherein the radial configuration of said inlet portion is substantially circular and the radial configuration of said outlet portion is substantially trapezoidal.

14. The rotary vacuum filter of claim 11, wherein said discharge conduit means deliver the flow of said filtrate to said valve-receiving space means in a direction normal to the axially-disposed axis of said space means.

15. The rotary vacuum filter of claim 11, said sidewalls being contoured such that their respective outer edges diverge from one another in a headwardly direction toward said outlet portion, and said end walls being contoured such that their respective outer edges converge from one another in a headwardly direction toward said outlet portion.

16. The discharge flow assembly of claim 15, wherein the radial cross-sectional configuration of the inlet portion of said discharge filtrate flow passageway is substantially circular.

17. The discharge flow assembly of claim 15, wherein the radial cross-sectional configuration of the outlet portion of said discharge filtrate flow passageway is substantially trapezoidal.

18. The discharge flow assembly of claim 15, wherein the radial configuration of the inlet portion is substantially circular and the radial configuration of the outlet portion is substantially trapezoidal.

19. A method of transporting a discharge filtrate stream in a rotary vacuum filter from a plurality of inlet conduit means to means defining an axially-extending valve-receiving space located at the discharge end of said rotary vacuum filter, while minimizing turbulence and air entrainment in said discharge filtrate stream, increasing the filtrate flow velocity, and minimizing the vacuum loss in said rotary vacuum filter, which comprises:
providing a plurality of radially-disposed, discharge conduit means comprising wall means, connected at one end to said plurality of inlet conduit means and joined at the other one to the other for defining said axially-extending valve-receiving space means, and
contouring the interior surface of said wall means to define a continuous, smoothly curved filtrate flow passageway;
directing the flow of said filtrate within said passageway at a constant rate of acceleration from the inlet portion of said discharge conduit means to the outlet portion of said discharge conduit means, respectively, to produce a discharge filtrate stream at an increased filtrate flow velocity having a substantially reduced level of turbulence and air entrainment.

20. The method of claim 19, which further includes the step of contouring said wall means so that the radial cross-sectional area of said discharge flow passageway is substantially constant from said inlet portion to said outlet portion.

21. The method of claim 20, which further includes the step of contouring said wall means so that the radial cross-sectional configuration of said flow passageway at said inlet portion is substantially circular and the radial cross-sectional configuration of said flow passageway at said outlet portion is substantially trapezoidal.

22. The method of claim 19, which further includes the step of delivering the flow of said filtrate to said space means in a direction normal thereto.

23. The method of claim 19, which further includes the step of providing said wall means comprising respective pairs of sidewalls and end walls, contouring said sidewalls such that their respective outer edges diverge from one another in a headwardly direction toward said outlet portion, and contouring said end walls such that their respective outer edges converge from one another in a headwardly direction toward said outlet portion.

* * * * *

UNITED STATES PATENT AND TRADEMARK OFFICE
CERTIFICATE OF CORRECTION

PATENT NO. : 4,816,169
DATED : March 28, 1989
INVENTOR(S) : Richard W. LaValley

It is certified that error appears in the above-identified patent and that said Letters Patent is hereby corrected as shown below:

Column 1, line 66 "esult." should be --result.--

Column 8, line 6, "increased flow" should be --increased filtrate flow--

Column 9, line 28, "discharge mens" should be --discharge conduit means--

Signed and Sealed this

Nineteenth Day of December, 1989

*Attest:*

JEFFREY M. SAMUELS

*Attesting Officer*   *Acting Commissioner of Patents and Trademarks*